(12) United States Patent
Smith

(10) Patent No.: US 7,084,775 B1
(45) Date of Patent: Aug. 1, 2006

(54) METHOD AND SYSTEM FOR GENERATING AND SENDING USER-CENTRIC WEATHER ALERTS

(75) Inventor: Michael R. Smith, Wichita, KS (US)

(73) Assignee: User-Centric IP, L.P., Pennsylvania, PA (US)

( * ) Notice: Subject to any disclaimer, the term of this patent is extended or adjusted under 35 U.S.C. 154(b) by 193 days.

(21) Appl. No.: 10/887,854

(22) Filed: Jul. 12, 2004

(51) Int. Cl.
*G01W 1/00* (2006.01)

(52) U.S. Cl. .................. 340/601; 340/905; 379/37; 702/3

(58) Field of Classification Search .................. 340/905
See application file for complete search history.

(56) References Cited

U.S. PATENT DOCUMENTS

| | | | |
|---|---|---|---|
| 4,806,851 A | 2/1989 | Krider et al. |
| 4,812,825 A | 3/1989 | Kennedy et al. |
| 4,996,473 A | 2/1991 | Markson et al. |
| 5,140,523 A | 8/1992 | Frankel et al. |
| 5,379,215 A | 1/1995 | Kruhoeffer et al. |
| 5,406,481 A | 4/1995 | Shinozawa et al. |
| 5,440,483 A | 8/1995 | Badoche-Jacquet et al. |
| 5,508,930 A | 4/1996 | Smith, Jr. |
| 5,517,193 A | 5/1996 | Allison et al. |
| 5,696,671 A | 12/1997 | Oliver |
| 5,699,056 A | 12/1997 | Yoshida |
| 5,717,589 A | 2/1998 | Thompson et al. |
| 5,771,020 A | 6/1998 | Markson et al. |
| 5,832,456 A | 11/1998 | Fox et al. |
| 5,839,089 A | 11/1998 | Yasuda et al. |
| 5,850,619 A | 12/1998 | Rasmussen et al. |
| 5,905,438 A | 5/1999 | Weiss et al. |
| 5,959,567 A | 9/1999 | Wolfson et al. |
| 5,974,360 A | 10/1999 | Otsuka et al. |
| 5,991,687 A | 11/1999 | Hale et al. |
| 6,009,374 A | 12/1999 | Urahashi |
| 6,018,699 A | 1/2000 | Baron, Sr. et al. |
| 6,023,223 A | 2/2000 | Baxter, Jr. |
| 6,031,455 A | 2/2000 | Grube et al. |
| 6,034,608 A | 3/2000 | Frank et al. |
| 6,081,220 A | 6/2000 | Fujisaka et al. |
| 6,112,074 A | 8/2000 | Pinder |
| 6,112,075 A | 8/2000 | Weiser |
| 6,118,230 A | 9/2000 | Fleischmann |
| 6,125,328 A | 9/2000 | Baron et al. |
| 6,128,578 A | 10/2000 | Sakaino et al. |
| 6,154,699 A | 11/2000 | Williams |
| 6,160,551 A | 12/2000 | Naughton et al. |
| 6,167,255 A | 12/2000 | Kennedy, III et al. |
| 6,198,390 B1 | 3/2001 | Schlager et al. |
| 6,240,365 B1 | 5/2001 | Bunn |
| 6,255,953 B1 | 7/2001 | Barber |

(Continued)

*Primary Examiner*—Thomas J. Mullen, Jr.
*Assistant Examiner*—George Bugg
(74) *Attorney, Agent, or Firm*—Banner & Witcoff, Ltd.

(57) ABSTRACT

A meteorological alert system for mobile devices and users that includes a weather information service for analyzing meteorological data, generating device-specific weather alerts and transmitting the alerts to a set of relevant devices is disclosed. The processing system may be built into existing wireless service provider infrastructure or consist of a standalone component capable of interacting with wireless services. The weather alerts and information transmitted to users may be based specifically on each mobile device's particular location and focuses maps and diagrams on the device as a central reference point. Alerts may be sent automatically based on continually monitored weather hazard information as well as based on continually or regularly monitored device locations.

37 Claims, 4 Drawing Sheets

U.S. PATENT DOCUMENTS

| | | | |
|---|---|---|---|
| 6,275,774 B1 * | 8/2001 | Baron et al. | 702/3 |
| 6,289,331 B1 | 9/2001 | Pedersen et al. | |
| 6,295,001 B1 | 9/2001 | Barber | |
| 6,304,816 B1 | 10/2001 | Berstis | |
| 6,351,218 B1 | 2/2002 | Smith | |
| 6,369,705 B1 | 4/2002 | Kennedy | |
| 6,405,134 B1 | 6/2002 | Smith et al. | |
| 6,490,525 B1 * | 12/2002 | Baron et al. | 702/3 |
| 6,498,987 B1 * | 12/2002 | Kelly et al. | 702/3 |
| 6,505,123 B1 * | 1/2003 | Root et al. | 702/3 |
| 6,581,009 B1 | 6/2003 | Smith | |
| 6,590,529 B1 * | 7/2003 | Schwoegler | 342/357.13 |
| 6,603,405 B1 | 8/2003 | Smith | |
| 6,646,559 B1 | 11/2003 | Smith | |
| 6,654,689 B1 * | 11/2003 | Kelly et al. | 702/3 |
| 6,754,585 B1 * | 6/2004 | Root et al. | 702/3 |
| 6,816,878 B1 * | 11/2004 | Zimmers et al. | 709/200 |
| 6,823,263 B1 * | 11/2004 | Kelly et al. | 702/3 |
| 6,836,730 B1 * | 12/2004 | Root et al. | 702/3 |
| 6,845,324 B1 * | 1/2005 | Smith | 702/3 |

* cited by examiner

METHOD AND SYSTEM FOR GENERATING AND SENDING USER-CENTRIC WEATHER ALERTS

FIELD OF INVENTION

The present invention relates generally to weather reporting and warning systems. More specifically, the invention provides a method and system for processing weather information and data for a specific location and using that information to send a warning to a user's mobile device regarding hazardous weather conditions.

BACKGROUND OF THE INVENTION

Inclement weather can wreak havoc on our everyday lives, whether it is creating setbacks in construction projects, drenching outdoor events or jeopardizing personal safety. Thus, those in all walks of life must tune in daily for the latest weather reports concerning the next day or the next few hours. Unfortunately, it is impossible to constantly view a television or even listen to a radio to check for minute-to-minute changes in the weather. Even the best weather prognosticators might not be able to predict an unexpected tornado or a sudden downpour until an hour or even minutes before it happens. Therefore, people are often unaware of approaching inclement weather conditions due to the unpredictable nature of weather and the little to no advanced warning. Additionally, society in the United States and much of the world is becoming increasingly mobile. People are often on the go within cities (e.g., picking up their children at school, or taking children to a baseball game) as well as between cities (e.g., traveling salespeople, truck drivers, etc.). Providing a faster and more immediate alert mechanism to warn of upcoming weather changes and/or current weather conditions of a given location could result in substantial savings in time and energy as well as a reduction in injuries inflicted by violent weather conditions.

In addition to the lack of a sufficient alert system for inclement weather, weather reporting services frequently produce generalized weather reports covering extensive areas (e.g., an entire state or county). For example, snow storm warnings are often applied to several tens of counties at once with no indication of the probability or relevance of the warnings to specific latitude/longitude coordinates or user locations. Consequently, people may get alerts that are not appropriate or applicable to their particular locale because the weather forecast/warning is not sufficiently personalized. These false alarms may produce substantial problems in a variety of areas. For example, if the National Weather Service issues a winter storm warning for the Mid-Atlantic region, residents of both Maryland and Virginia would be alerted. However, the storm would most likely reach various parts of the two states at different times. Therefore, since these reports and warnings provide little in the way of individualized weather reporting according to specific locations, a construction crew working in northern Maryland may be erroneously alerted into thinking that the storm will strike within half an hour. In actuality, the storm does not hit northern Maryland until three hours later. As a result, the construction crew may fail to properly store and protect their equipment because they are under the mistaken impression that they have no time. They may also fail to capitalize on two additional hours of work and begin to fall behind on their schedule. Their equipment and tools may be damaged costing both the crew and the contracting company time and money. In another example, a study showed that, in 1992, the Wichita, Kans. restaurant industry incurred an unnecessary cost of approximately $1,000,000 in a weather related event due to a lack of geographic specificity of a tornado warning. A system that provides more particularized meteorological data specific to a person's location would alleviate such issues and provide advantages in time, efficiency and cost.

Other systems and methods have been proposed to provide more immediate meteorological data according to location. One such system is the Vehicle-Centric Weather Prediction System and Method (U.S. Pat. No. 6,603,405). However, the system and method in the '405 patent has a limited feature set and can be improved upon for use with ultra mobile devices, such as mobile phones. Therefore, a method and system are needed to report or alert current weather conditions at a mobile user's location on a mobile device using a rich feature set that takes advantage of a mobile phone's resident capabilities. As such, it would be useful to develop a weather warning/data system and method that interacts with a mobile device already owned and used by the general public.

There are also a number of systems available that provide storm warnings for specific locations. For example, there is "Notify!" from The Weather Channel®, "Mobile My-Cast®" by Digital Cyclone, Inc., and wireless weather from Accu-Weather. One deficiency of these systems is that they require the user to register for storm notifications for fixed locations. As such, these warning systems are not truly mobile since the services do not provide notifications for the particular and specific location of someone in motion nor do they provide service to someone who is situated at a non-registered location. Another deficiency of these services is that they implement a fixed menu of storm criteria. Specialized users (e.g., athletic trainers and railroad road masters) may consider high temperature warnings just as significant as lightning and thunder warnings. Since these services do not allow the user to fully customize a notification system over the widest range of meteorological possibilities, users may not receive warnings that they desire. Furthermore, none of these services have provisions for additional geo-hazards (e.g., volcanoes and earthquakes) or manmade hazards (e.g., homeland security threats).

The aforementioned problems give rise to the solution provided by the present invention.

SUMMARY OF THE INVENTION

The invention provides a system and method for receiving personalized weather reports based upon a receiving individual's location (e.g., latitude/longitude) to warn users of approaching or current inclement weather conditions and to avoid the hassles and costs of unexpected weather changes. In one embodiment, a mobile phone user will be able to retrieve the current or approaching weather for his or her location through their mobile phone device. The wireless provider may provide the user's location, using methods such as GPS tracking and/or triangulation, to a weather information center. The weather information center may then transmit meteorological information that it may collect or retrieve consistent with the user's location back to the wireless customer. Transmission of such information may be sent directly to the user's wireless device or it may go through any number of relay stations. Transmissions may travel over a range of mediums such as telephone lines, packet switched networks, the Internet, mobile telecommunications networks and the like.

A weather reporting algorithm identifies the current weather conditions surrounding a particular area and determines the appropriate times to alert the wireless user. This algorithm may take into account factors such as user preference, gravity of the weather, imminence and probability. A weather alert may take the form of a visual warning, an audible alert or even a vibrating alarm. A visual component of a weather alert may also include maps and diagrams of a user's present location in relation to the approaching weather conditions. Other information may be provided to the wireless user such as an estimated time of arrival, the probability it will hit the user's specific area and/or the speed with which the weather condition is traveling. The visual alerts may also be in real-time, continuously updating the maps and meteorological information. Other features and advantages of the invention will become apparent by reading the following detailed description, figures, and claims.

DETAILED DESCRIPTION OF THE INVENTION

Figure 1:
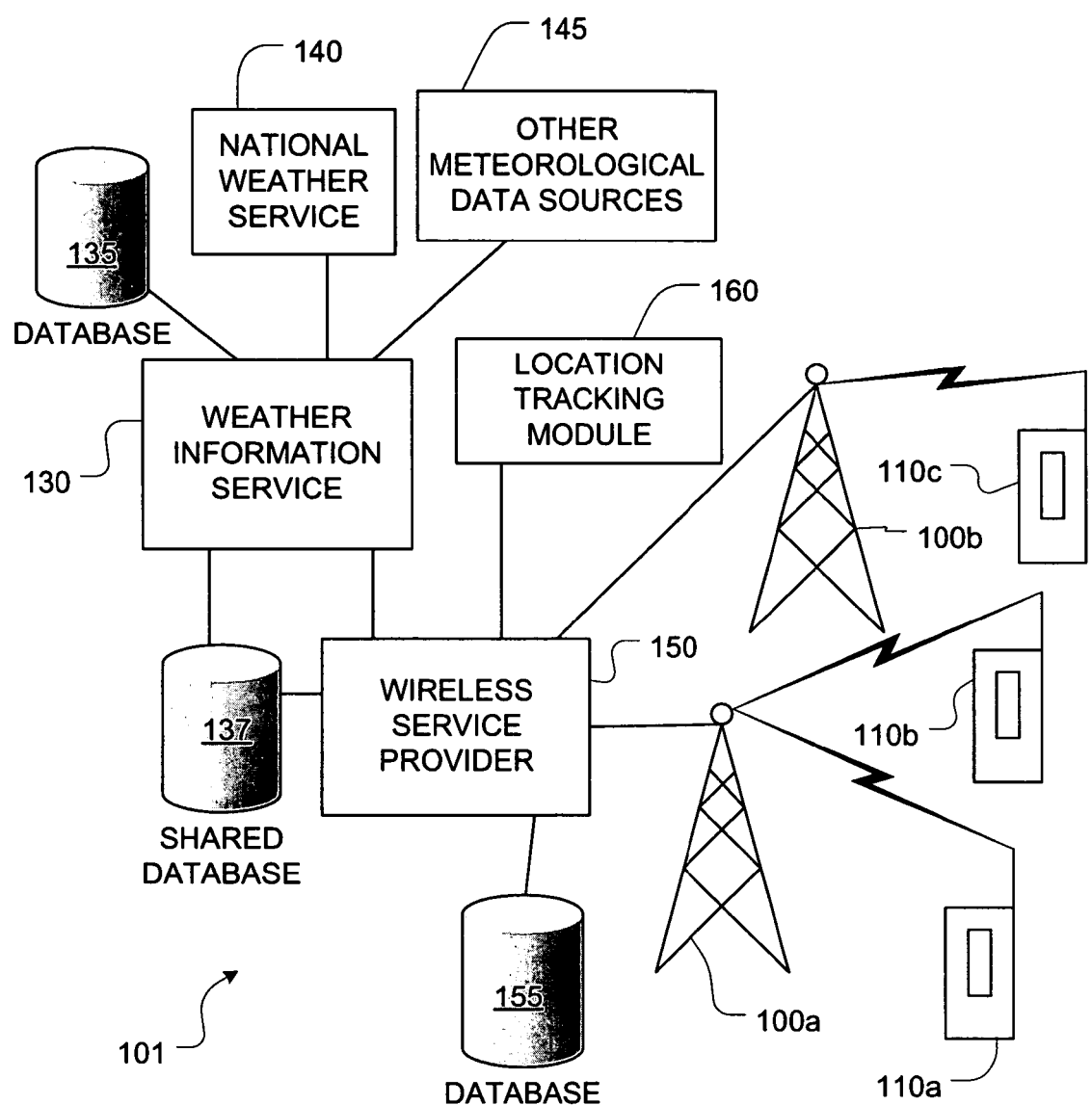
FIG. 1 illustrates a system for sending and receiving individualized weather information on portable devices according to an illustrative embodiment of the present invention.

FIG. 1 illustrates a system 101 for sending and receiving individualized weather information on portable devices according to an illustrative embodiment of the present invention. The system 101 may include a wireless service provider 150 (e.g., Sprint PCS, Cingular, Nextel, etc.) having a plurality of wireless service towers 100a & 100b, through which a plurality of mobile devices 110a, 110b & 110c and a weather information service 130 communicate. Users of mobile devices 110a, 110b & 110c typically communicate with other mobile users in conjunction with service provider 150 and towers 100a, 100b when a land line is unavailable or otherwise inconvenient. In order to facilitate such communication, mobile devices 110a, 110b & 110c may send and receive a variety of data, including voice, text and video communications. Wireless service towers 100a & 100b may also be used with other information sources to receive and relay data to other entities, as is known in the art. Wireless towers 100a & 100b may also be used to obtain information regarding particular devices 110a, 110b & 110c, for example, wireless towers 100a & 100b may be used to determine the location of individual mobile devices 110a, 110b & 110c through various measurement or detection methods in accordance with the FCC's E911 mandate. The invention may also be used with a satellite telecommunications network and satellite phones, such as are used in the Iridium® network (discussed further below).

Each mobile device 110a, 110b & 110c may comprise a cellular telephone, personal digital assistant (PDAs), laptop, wireless pager/beeper, or other data processing device with wireless communication capabilities. Mobile devices 110a, 110b & 110c each comprises a wireless communication component, capable of receiving and sending packets of information (voice and/or data) to and from one or more wireless service towers 100a & 100b for further communication to wireless service provider 150, weather information service 130, other data service providers (not shown), or for further communication via another network such as the Internet (not shown). Mobile devices 110a, 110b & 110c may be capable of receiving not only text, graphics, or audio data, but also video information depending on the components and software installed. In addition to communicating with and through wireless service towers 100a & 100b, mobile devices 110a, 110b & 110c may also comprise a feature (e.g., SMS, EMS, MMS, email, text messaging, etc.) whereby mobile devices 110a, 110b & 110c may communicate by sending messages to one another. Such functionality may also utilize direct connect methods and components similar to walkie-talkie or Citizens Band (C.B.) radio technology. Mobile devices 110a, 110b & 110c may further comprise memory or other storage modules (internal or external) for receiving and saving data. For example, a user of a mobile device 110b may receive a visual weather alert depicting a storm 25 miles away and heading southeast. The user may wish to reexamine the meteorological map or study additional details two minutes later. Rather than increase network load by requesting an identical transmission of the previously received alert, the user may instead recall the saved weather information from the storage modules of his/her mobile device 110b. The mobile device may display the user's updated/current location on the saved alert map (in embodiments where the mobile device receives a map without the device's location already marked) or may display the old map with the mobile device's location as of the time of the alert (in embodiments where the mobile device receives an alert map with the device location already marked).

A weather information service 130 is used to process meteorological information and generate and deliver custom alerts to users of mobile devices 110a, 110b & 110c, based on the unique location of each mobile device 110a, 110b, & 110c. In order to provide access to the information and alert system, weather information service 130 may initially require users of mobile devices 110a, 110b & 110c to register with the service 130 and/or wireless service provider 150 to receive weather alerts. Registering increases the efficiency of weather alert processing and reduces the amount of data the information service 130 needs to process meteorological alerts because the weather information service 130 can refer to predefined registration information. Weather information service 130 may receive meteorological data, analyses and/or other meteorological information from a third-party meteorological service such as the National Weather Service (NWS) 140 or other meteorological data sources 145 (e.g., weather stations, independent meteorological information providers, etc.). The weather information service 130 may also make calculations based on received information for unique combinations of data that might comprise a hazardous condition. For example, weather information service 130 may determine through calculations that simultaneously high values of temperature and humidity as received from source 140 and/or source 145 can create a dangerously high "heat index" for which a summer outdoor event may need to be suspended or relocated to an area of cooler conditions. Such data may be gathered from the nearest weather station so that the weather information service 130 does not have to maintain its own thermometer or hygrometer. The weather information service 130, NWS 140 or other weather information sources 145 may additionally comprise tools for acquiring raw meteorological data (e.g., measurements). For example, service 130, NWS 140 or source 145 may employ barometers, thermometers, radars (e.g., NEXRAD) and hygrometers to evaluate weather conditions. Weather information service 130 may also comprise a storage database 135 used to store and manage meteorological information and/or user registration information (e.g., mobile device ID and current location). Weather service 130 may store and retrieve information to and from the database 135 to create individualized weather reports or alerts for registered users (or other users upon request), and may also store weather reports and alerts themselves. Weather service 130 may also communicate with wireless service provider 150 to receive device location information and to provide location-dependent weather reports and alerts for further delivery to specified mobile devices 110a, 110b, and 110c, as applicable. That is, weather service 130 prepares weather alerts and reports based on specific locations of each mobile device as provided by the wireless service provider 150, and sends the alerts and reports to users of mobile devices 110a, 110b & 110c through the wireless service provider 150 and service towers 100a and 100b.

Weather information service 130 and wireless service provider 150 may also or alternatively interact through a shared, common database 137 where information needed or used by both service 130 and service provider 150 may be stored. For example, the wireless service provider 150 may store the location information for mobile devices 110a, 110b & 110c in common database 137. Instead of requesting the location data from the wireless service provider 150 directly, the weather information service may independently retrieve the location information from the common database 137.

Wireless service provider 150 may use a location tracking module 160 to coordinate polling devices for their locations (or polling service towers 100a and 100b for locations of devices located within the service area of each service tower). Wireless service provider 150 may store the location information in database 155, as well as other user information (e.g. preferences, profile information, etc.) regarding each user and/or corresponding mobile device 110. In one example, wireless service provider 150 may instruct location tracking module 160 to retrieve or update the locations of each mobile device 110a, 110b & 110c every 15 minutes to reduce network load. Since the wireless service provider 150 or another service such as weather information service 130 may need the location information between updates, the location data may be stored in the database 155 and/or database 137 for increased accessibility and faster retrieval.

Each device's location may be determined in a variety of manners. For example, some mobile devices 110 may be equipped with a resident GPS module with which the mobile device 110 can determine and transmit its location back to wireless service provider 150. For a device not equipped with a GPS module or otherwise not providing its own location, location tracking module may receive location information based on signal triangulation of the mobile device by one or more service towers 100a and 100b. For example, service towers 100a and 100b may use various location triangulation techniques, such as Angle of Arrival (AoA), Time Difference of Arrival (TDOA), location pattern matching (LPM), and the like. Those of skill in the art will appreciate that the method of determining each mobile device's location is secondary to the fact that the wireless service provider 150 can determine the mobile device's location with reasonable certainty, e.g., to satisfy the FCC's E911 mandate.

Those of skill in the art will appreciate that the architecture illustrated in FIG. 1 is illustrative in nature, and that modifications may be made without departing from the spirit and scope of the invention. For example, in an alternative illustrative embodiment of the invention the wireless service provider 150 may have its own internal weather processing infrastructure (not shown) that performs the duties of weather information service 130. Instead of sending the locations of mobile devices 110a, 110b & 110c to a third-party service such as the weather information service 130, wireless service provider 150, by maintaining its own weather processing infrastructure (not shown), can analyze meteorological data and determine whether to send a weather alert to users of particular mobile devices 110a, 110b & 110c. This may be advantageous by reducing alert processing time (e.g., not having to wait for a third-party to respond to a weather alert request), preserving the security and privacy of users of mobile devices 110a, 110b & 110c by not sharing location information, and by reducing communication traffic, which may in turn improve Quality of Service. Using its own weather processing infrastructure, wireless service provider 150 may retrieve meteorological data specific to a mobile device's exact location directly from a weather information source such as the NWS 140 or other source 145. The wireless service provider 150 can then control the storage and retrieval of location information, meteorological data and customer preferences all within one or more internal databases that do not need to be shared with any third parties. The infrastructure may also send alerts directly to mobile devices 110a, 110b & 110c through wireless towers 100a & 100b or it may pass alert transmissions to other communication components of the wireless service provider 150.

Communications may be sent between wireless service provider 150, location tracking module 160, weather information service 130, meteorological sources 140, 145, service towers 100a and 100b, and mobile devices 110 via wired or wireless communications, as is known in the art. The weather information service 130 or wireless service provider 150 may transmit alerts to service towers 100a and 100b through non-wireless networks and allow the service towers to rebroadcast the alert wirelessly to a predetermined area or mobile device. Alternatively, satellite communications may be used, e.g., in the Iridium® network or other satellite communications networks. That is, information may be transmitted to a satellite, which may in turn retransmit the data to a final destination (e.g., mobile devices 110a, 110b & 110c), thus eliminating the need for ground-based antenna systems 100a & 100b.

Figure 2:
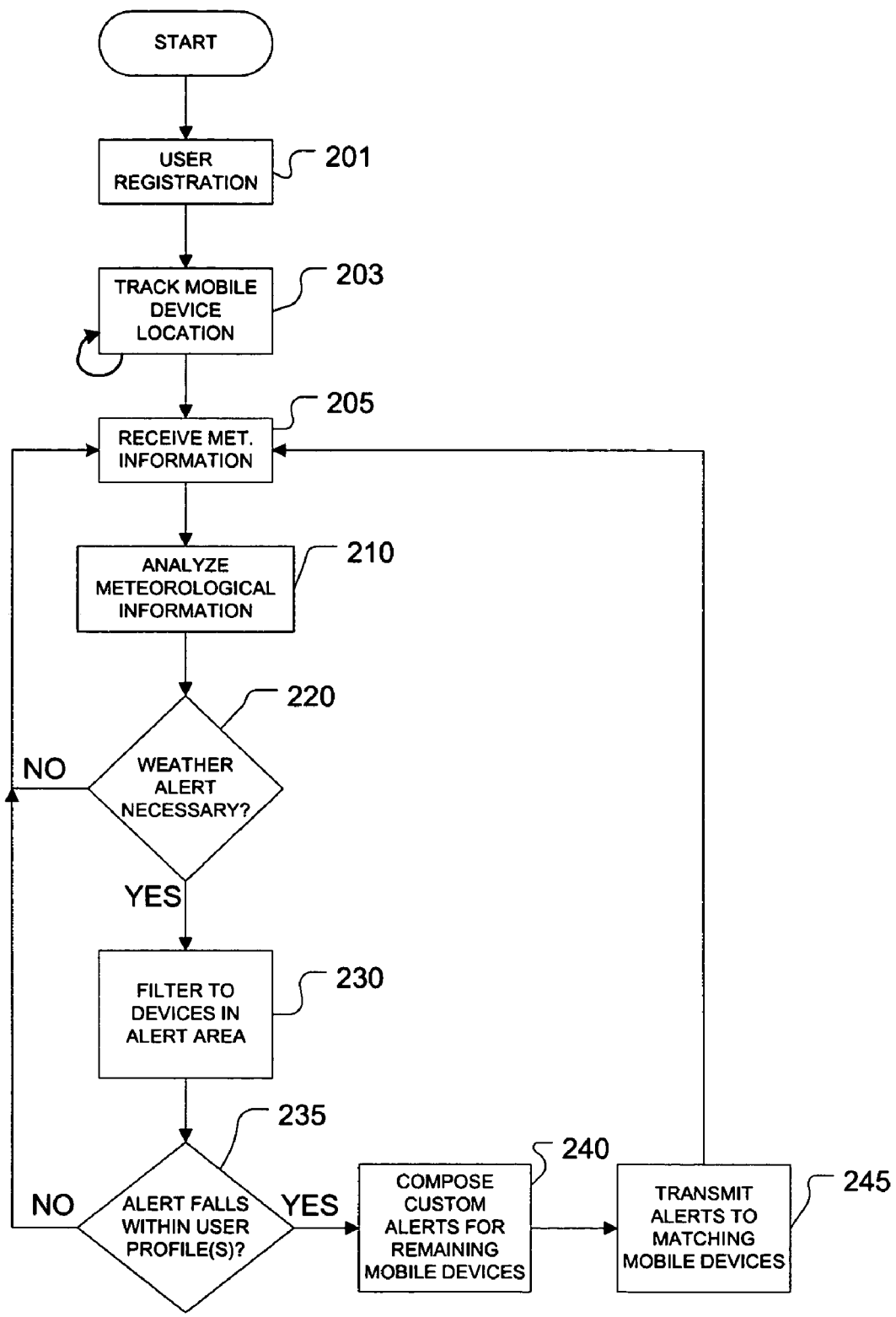
FIG. 2 illustrates a flow chart for a process by which a registered weather information service user may be alerted to weather conditions through a mobile device according to an illustrative embodiment of the present invention.

FIG. 2 illustrates a flow chart for an illustrative process by which a weather information service user may be alerted to weather conditions through his or her mobile device according to an illustrative embodiment of the present invention. To access the weather alert features, the user in step 201 registers his or her mobile device with the weather information service 130 so that the weather information service 130 knows to track the location of the user's mobile device when evaluating and transmitting weather alerts. Registration may include the user providing his or her mobile device identification (e.g., telephone number) to the weather information service 130, as well as information specifying the types of alerts the user would like to receive.

For example, the user may specify that he or she would like to receive alerts with low, medium, and high urgency.

The user may alternatively select medium and high urgency, or simply high urgency. The urgency level may be defined by weather information service 130, NWS 140, or by some other source and/or criterion. In some embodiments, the user may specify dates and times to receive alerts. For example, the user may specify that he or she does not want to receive alerts from 9 am–5 pm because he or she might be at a location (e.g., work) where he or she can receive important meteorological information through other channels, or does not otherwise want to be disturbed. The user may also or alternatively specify locations where he or she does or does not want to receive weather alerts. For example, the user may specify that, when at home (e.g., as defined by the user sending a message from the phone when at the home location), the user does want to receive alerts, but when at a location other than home the user does not want to receive weather alerts. The user may also specify that the user wants to receive alerts regardless of the mobile device's present location.

Upon registration with the weather information service 130, the wireless service provider in step 203 tracks the location of the user's mobile device and makes the location available to wireless service provider 130 (e.g., via shared database 137) along with an ID specific to the user's mobile device. The ID may be the mobile device's phone number, or may be some other ID that maintains the privacy of the mobile device and its owner/user. The wireless service provider 150 may continually monitor the location of the registered mobile device, or may update the location at predefined intervals.

Next, in step 205, the weather information service receives or retrieves meteorological information from one or more third-party sources 140, 145, and/or from its own meteorological instruments and devices. Meteorological information may be received automatically as a result of the third party source 140, 145 automatically sending meteorological information, or weather information service may request specific information for a predetermined geographical area based on a mobile user requesting weather information. That is, when a user of a mobile device requests a weather update via his or her mobile device, weather information service 130 may poll its internal and external weather information sources to ensure that it has current information for the location of the requesting mobile device. The data received at the weather information service may comprise pre-analyzed warnings (e.g., GIS warnings from the NWS according to specific geographic coordinates) or raw data from measurement devices such as those discussed above. The information may also comprise observation data from meteorologists or predictive analyses. The information service center may also request data from a plurality of weather information services or sources to ensure accuracy and complete coverage.

In step 210, after receiving the meteorological information, the weather information service analyzes the meteorological information as compared to the locations of each registered user's mobile device to determine whether inclement or hazardous weather might affect the area of a registered user (based on the location of the registered user's mobile device). It will be appreciated in the meteorological art that there are many different methods of analyzing weather information to predict or forecast inclement conditions. Some methods of generating forecasts may be based on barometric readings, evaluating wind strength and direction and analyzing radar information. Those of skill in the art will appreciate that the method of forecasting weather is secondary to the ability of the system to forecast weather and determine whether inclement or hazardous weather may affect a registered user based upon a given location of the registered user's mobile device. In step 210, weather information service 130 primarily determines whether any weather alerts are required based on the received meteorological information. Comparison to specific device locations may occur at a later step.

In step 220, upon reviewing the meteorological information, weather information service determines whether an alert is necessary for any geographic area serviced by weather information service 130. If not, the method returns to step 205 (step 203 occurs automatically or at regularly scheduled intervals). If any weather alerts are necessary, in step 230 the weather information service 130 queries shared location database 137 to determine whether any mobile devices are presently located within the geographic area for which the alert or alerts need to be sent. For example, weather information service may determine which mobile devices are in the alert area by comparing the each device's location to the GIS coordinates of the weather alert, or within a predefined distance of the weather alert. That is, each user may define a buffer distance around the warning as an added measure of safety (or a default buffer distance may be used). For example, one could choose to receive warnings for the area defined in the GIS warning and a three mile buffer around the warning.

For devices that are within the geographical area for which an alert needs to be issued, for each registered user, in step 235 the weather information service determines whether the alert that needs to be issued falls within each registered user's profile data. That is, the weather information service 130 determines whether the alert is of the type that the user has indicated that he or she wants to receive. Weather information service 130 may also determine whether each registered user's mobile device is in a physical location for which the user has indicated that weather alerts are permissible, as discussed above. Weather information service 130 then removes from the list of devices to be alerted those devices whose corresponding user profiles indicate that no weather alert should be sent.

In step 240, weather information service 130 has remaining on the alert list those devices located within the geographic area for which an alert should be sent, and whose user profiles indicate that an alert should be received under the conditions of the present weather alert. Weather information service 130 then creates a custom alert for each mobile device based on that mobile device's current location. That is, weather information service 130 generates a graphic, text, or audio alert specific to the mobile device, based on the mobile device's location as determined by GPS, TDOA, AoA, LPM, etc. Each device's location may be represented as a latitude/longitude pair, or by any other location defining data now known or later developed.

Figure 4:
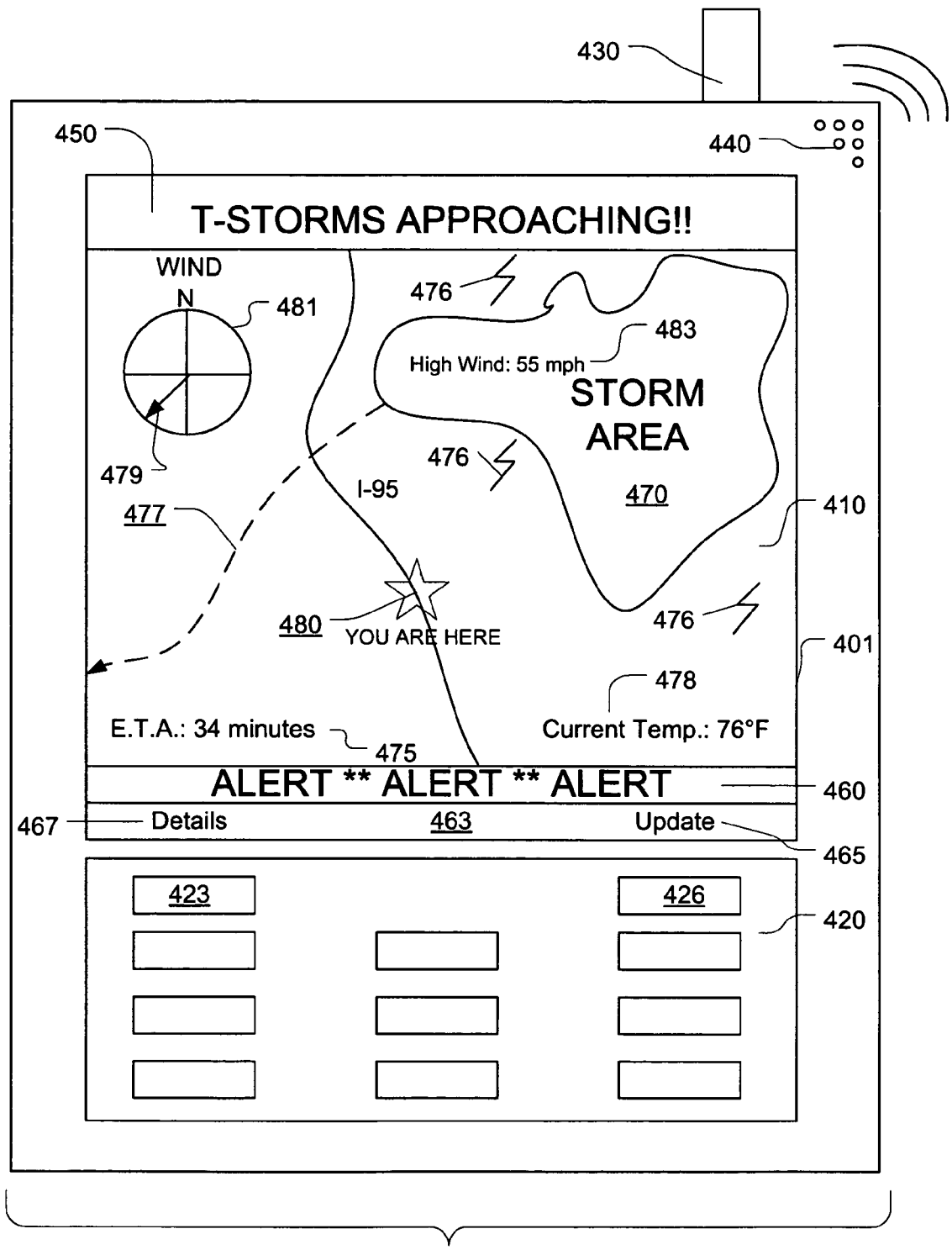
FIG. 4 illustrates a weather alert received on a mobile device according to an illustrative embodiment of the present invention

Each weather alert may comprise a variety of forms. FIG. 4 illustrates an alert 401 displayed on a mobile device 400 according to an illustrative embodiment of the invention. It will be appreciated that there exist a number of different mobile devices 400 capable of receiving text, video and/or audio data. Such devices include mobile phones, PDAs and beepers/pagers. The mobile device 400 may comprise an audio component (speaker) 440, an antenna 430, a video display screen 410, a vibration module (not shown) and a keypad 420. The keypad 420 may be used to enter phone numbers, enter data, navigate menus and request information. The audio component 440 may emit a ring, tone or other audible notification when operating the mobile device 400. For example, when the mobile device 400 receives an incoming call, the audio component 440 may play a polyphonic ring tone to alert the user of the call. The audio component 440 may also emit beeps or other tones when a user engages individual buttons on the keypad 420. Likewise, a vibration module may be used to alert the user in similar situations. Special predefined ringtones and/or vibration may be used to alert the user that a weather alert has been received at the mobile device. The video screen 410 may display a variety of information as part of the weather alert. Such information may be comprised of a static image, an animation or video, and/or text.

Users may elect to receive audio, visual or physical alerts or a combination of any number of the three, depending on the capabilities of the user's mobile device. For example, a user may receive a visual warning illustrated by the image 401 on display screen 410. The image 401 on screen 410 may be a map, radar image or a representation derived from radar data and/or other weather information resources superimposed on a map, with an indication 480 of the user's present location as compared to the impending weather. The radar image or map representation 401 may also provide additional levels of detail, including roads, buildings, and/or landmarks, depending on the scale of the map. Such detail may aid the user of the mobile device in judging the storm's relative location and distance. The weather alert 401 may include a visual or graphic representation of impending weather 470, as well as additional storm information such as wind data 483. High wind data 483 may indicate the highest wind speed detected within or around the immediate vicinity of the impending weather 470. Additionally, the visual display may comprise indicators showing the direction of storm movement 477 as well as the direction of wind 479.

The user's current location, indicated by icon 480, may be placed in varying locations on the representation. In one example, the device's location will always be centered in the display and all weather information and data will be relative to the user's central position, with the map oriented with North at the top of the display. In another embodiment, where the wireless service provider (or the device itself) not only knows the present location of the mobile device, but also is aware of the direction of travel of the mobile device (e.g., based on historical locations, locations over a predetermined preceding window of time, a predetermined number of prior locations, a determination that the mobile device is following a specific road based on location movement, etc.), the map may be oriented such that the mobile device's direction of travel is at the top of the display, and the mobile device may rotate the map based on a change in the direction of travel of the mobile device. For example, the mobile device may continuously rotate the map to keep the direction of travel at the top of the display screen, thus giving the map an animated appearance. Alternatively, the mobile device may display periodically update the map orientation as the mobile device receives or detects changes in the user's direction of travel. A directional compass 481 may be used to inform the user of the map's present orientation.

The alert 401 may include other textual information, such as current temperature 478, estimated time for the storm's arrival 475 at the mobile device's present location, and locations of lightning strikes 476. Top banner 450 and lower banner 460 may comprise information related to the type of weather and the severity of the alert. For example, top banner 450 may indicate that the alert is for approaching thunderstorms. Banner 460 may indicate the importance of the warning, e.g., by displaying an alert severity level, or by displaying one "ALERT" to indicate low importance, two "ALERT" indicators for medium importance, or three "ALERT" indicators to warn of emergency weather information. Other methods may also be used to indicate the importance of the weather alert. Such methods may comprise the use of stars (i.e., the more stars, the more severe), color codes (blue meaning weak warning, red meaning emergency warning) or a severity meter. Other information may be included in the weather alert, such as lightning warnings, flood warnings, etc.

The visual display 410 may further comprise a menu bar 463 with options for the user to receive additional details 467 and update 465. A user may activate either of these options by pressing the corresponding keypad buttons 423 and 426, respectively. Because a visual representation of the weather alert may include limited textual information, a user may select the details option 467 in order to view more specific textual information concerning the warning, e.g., textual information that is received as part of the weather alert but not initially displayed by the mobile device 400. For example, a winter storm warning may indicate, through a visual representation, an incoming snow storm. However, in order to view additional details such as the predicted accumulation, the duration of the storm and/or the predicted temperature, the user may need to press the keypad button 423 corresponding to the details option 467.

Alternatively, a user might not want additional information but may want to update the visual representation or textual information relating to the weather alert. Although the weather information service and/or the wireless service station may provide automatic updates, the user may wish to receive an update more frequently than is automatically sent. In such an instance, the user may select the keypad button 426 corresponding to the update option 465 to retrieve the latest visual display or alert information. Upon selection of update option 465, the mobile device sends a message to weather information service 130 via wireless service provider 150, indicating that a weather alert update is desired. The weather information service may then compare the requesting mobile device's current location to current meteorological information, and send an updated weather alert to the requesting mobile device.

Weather information service 130 may compose each graphic for individual users by overlaying radar data, GIS warning information, and lightning data over a base map centered or otherwise based on the present location of the mobile device corresponding to the registered user. Alternatively, a simple text-based alert may be composed and sent to devices without sufficient graphics capabilities. Variations of the above described weather alert may also or alternatively be sent to each mobile device. Information that may be included in each weather alert may include information specified by the user's preferences to indicate what information he/she wants to have included in any given warning. For example, if a user does not want the temperature 478 displayed, the user may deselect an option to eliminate the temperature text 478. In another example, a user might not want the banners 450 & 460 and may therefore eliminate that option from the visual display menu. A user may also set preferences to indicate parameters for alerting the user. These parameters may comprise the severity of the storm, the distance of the storm and the probability of the storm hitting the user's location. A user may also select options such as the coverage area of the representative map and the update frequency.

A user may optionally activate a special audio alarm or alert so that he/she does not need to constantly view the display screen to be notified of inclement weather conditions, or so that the user knows when a new alert is received.

When an alert is sent to the mobile device 400, the device 400 may play a special ring tone or beep a specified number of times to alert the user that a new weather alert has been received, as opposed to an incoming phone call or email. Alternatively, device 400 may comprise a voice simulation component that may speak or announce the warning. For example, in the event of an approaching tornado, device 400 may announce "Tornado warning! Tornado warning!" as simulated electronic speech or by playback of an audio file. A vibration module (not shown) may also be activated in the mobile device 400 for situations when audio alerts are inappropriate or when visually checking the mobile device 400 may be inconvenient. When the vibration alert option is selected/activated, the mobile device 400 may vibrate sufficiently violently to notify the user of a weather alert. For example, if a user is in a business meeting, an audio alert may be distracting and disrespectful. Similarly, visually checking the mobile device 400 may demonstrate disrespect and/or disinterest. Therefore, a user may select a vibration alert and when a weather warning is received, the mobile device 400 will silently vibrate with a predefined cadence in the user's pocket. It will be appreciated that any of the above mentioned alert options may be used alone or in conjunction with one another.

In another embodiment of the present invention, the user of a mobile device may request weather reports manually. Wireless service provider or weather information service may respond to coded inquiries that a user can manually enter through a mobile device's keypad or phone-pad. For example, if a user wants to know the current weather in his or her area (to decide whether or not to bring an umbrella), the user may enter a code such as WX* and transmit the code to his/her wireless service provider. The service provider, detecting that this is the weather information code, will then process the user's request using either its own weather processing infrastructure or the third-party weather information service. Therefore, a user does not have to wait for automatic alerts or updates to receive current weather information. It will be appreciated in the art that any number of codes or access methods may be used depending on the service provider. Additionally, a user may retrieve weather information through a menu system or voice command.

Figure 3:
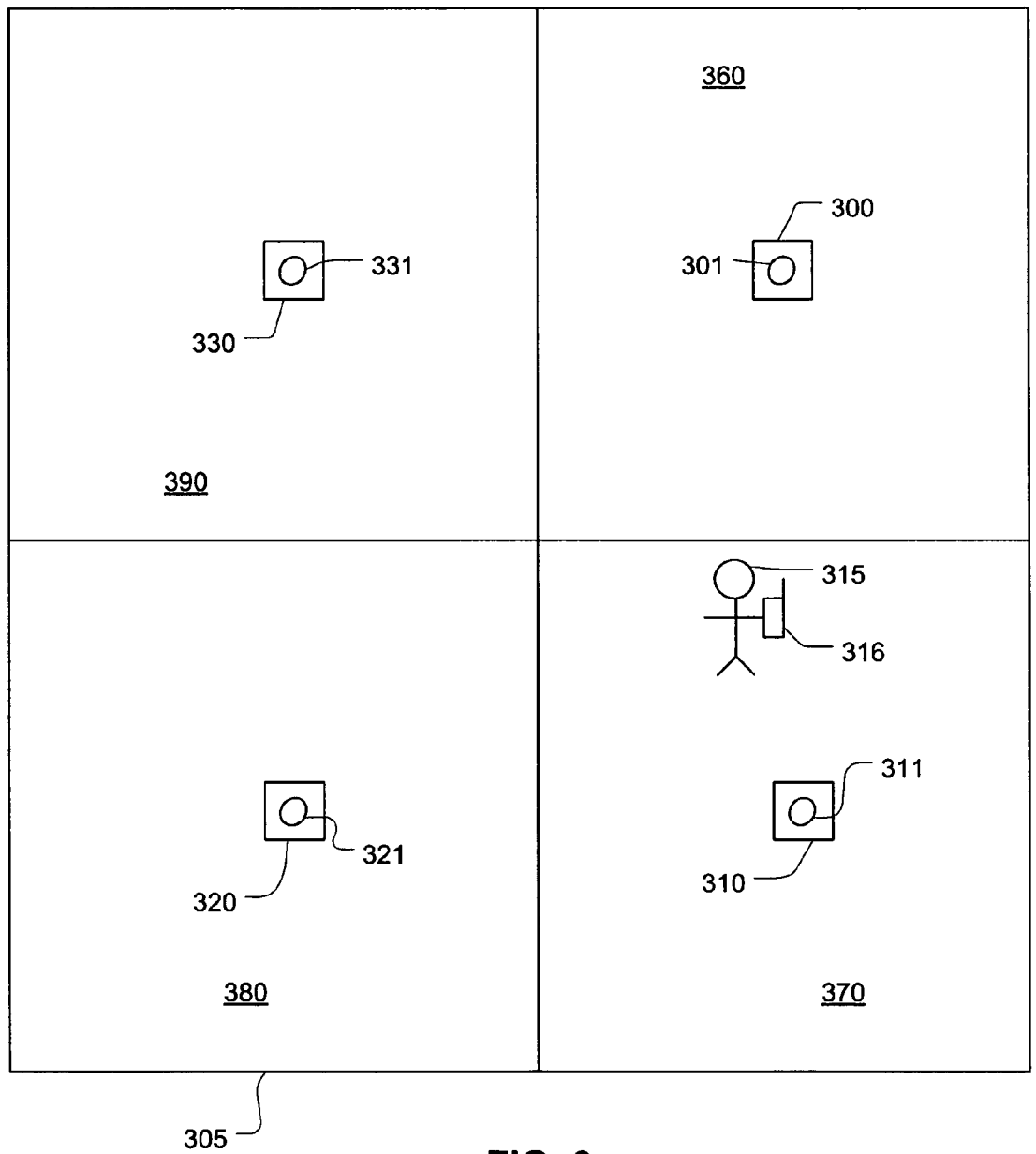
FIG. 3 illustrates a multi-station weather alert system according to an illustrative embodiment of the present invention.

Referring back to FIG. 3, system 101 (FIG. 1) may be divided into a multi-station system according to an illustrative embodiment of the invention in order to manage large numbers of registered users. The embodiment illustrated in FIG. 3 may help to address problems with managing millions of registered mobile devices at once, or of managing devices over a large geographical area. An alert system covering an entire nation of wireless users may require the establishment or use of weather information service substations 300, 310, 320 & 330. These substations 300, 310, 320 & 330 may each perform the services of weather information service 130, but only for an assigned geographical area (e.g., a county or a city) of pre-determined size. This will allow the wireless service provider 150 or weather information service 130 to divide the processing tasks between several stations rather than one main station for a state or even an entire country. A multi-system approach may further improve response time and computing efficiency. There may also be some coordination between stations to ensure effective alert coverage and timely warnings.

To facilitate communications to and from a large number of users or over a large geographical area, several weather information service substations 300, 310, 320 & 330 may be available to a user 315 and his/her mobile device 316. Alternatively, each mobile device may be assigned to a specific wireless information service substation based on the mobile device's present location. Each weather information service substation 300, 310, 320 & 330 may be responsible for all communications within a predetermined area and, more specifically, the transmission of weather alerts to the users 315 within the respective areas. In one example, a service area 305 may be divided into four zones 360, 370, 380 & 390. Each zone may comprise a weather information service substation 300, 310, 320 & 330, respectively. Weather information service substations 300, 310, 320 & 330 may comprise wireless towers 301, 311, 321 & 331 for directing communications to and from users in the station's assigned zones 360, 370, 380 & 390 and for acquiring user information like location. However, the geographic area of each weather information service substation need not necessarily correspond to service areas of towers 301, 311, 321, or 331, or of wireless towers (base stations) 100 (FIG. 1).

Each weather information service substation 300, 310, 320 & 330 may maintain a database of locations of wireless devices within its pre-assigned area 360, 370, 380 & 390, respectively. Locations may alternatively be stored elsewhere in the mobile telecommunications network such as a common database used by all weather information service substations 300, 310, 320 & 330, as well as by the wireless service provider servicing each region. Each weather information service substation may then receive and analyze meteorological information as compared to mobile device locations for its respective geographical area, as described above.

Using the present invention, weather information service 130 can evaluate the suitability of weather alerts on an individual device-by-device basis based on exact locations of each mobile device. The suitability of alerts may be analyzed with a location-specific approach, without restricting alerts to a specific city or zip code. The evaluation process may take into consideration factors such as distance from each user, severity, possible after-effects and probability of striking the mobile device's particular location or area. For example, a snow storm within 45 miles of a user's mobile device may be traveling away from that particular user. Therefore, even though the user may be in the same county as a GIS warning, the user might not be within the exact boundaries of the GIS warning and can thus avoid an unnecessary alert. It will be appreciated in the art that a number of other factors may be taken into account when determining whether to send a weather alert.

The present invention may be expanded to encompass warnings concerning non-meteorological conditions such as bomb detonations, the release of dangerous gases, and terrorist acts. In such events, one embodiment of the present invention may coordinate with one or more state or federal agencies such as the Department of Homeland Security or state or local agencies that may issue warnings or alerts upon such an occurrence. For example, if a plume of hazardous materials is released into the air, weather information service may receive data from the Department of Homeland Security regarding the size, severity and movement direction of the plume. This data may then be processed and transmitted to applicable users within the weather alert service's zone according to the invention as described above. The present invention may also be applied to other geo-hazards such as earthquakes and volcanic eruptions if useful warnings can be created (i.e., warnings that are more than merely speculative, and include some element of specificity and certainty).

As discussed briefly above, the present invention may be expanded to provide increased flexibility in warning coverage and improved forecasting of future weather conditions by basing warning on not only the location of the mobile device, but also on the direction of travel of the mobile device. Because weather is constantly changing and moving, techniques to anticipate changes (e.g., a mesoscale meteorological model, Growth and Decay Algorithm, advection model) may be implemented so that the future intersection of the user and the hazardous weather may be anticipated and the user can be sufficiently warned. The system may comprise an algorithm to determine the approximate speed and direction of travel of the mobile device to compensate for user movement. The user may then elect to receive warnings prior to entering a warning area based on the expected time the user will cross into the applicable warning area. Taking user movement and weather changes/movement into account allows the system to notify a user far in advance thereby increasing the amount of time with which the user may respond.

Meteorological data specific to exact mobile device locations supplies users with reports of higher accuracy and relevancy than previous known systems. While the present invention has been described in connection with specific illustrated embodiments, it will be appreciated and understood that modifications may be made without departing from the spirit and scope of the invention as defined by the appended claims.

What is claimed is:

1. A computer-implemented method for sending location-specific alerts to a plurality of mobile devices having wireless communications capabilities, comprising:

receiving at a weather information service, location data for a plurality of mobile devices, wherein each location data substantially uniquely identifies a single mobile device;

receiving at the weather information service, meteorological information corresponding to a geographical area in which the plurality of mobile devices are located;

determining whether a weather alert should be issued based on the received meteorological information and, if so, determining a geographic boundary of the weather alert;

comparing the location data for each of the plurality of mobile devices to the geographic boundary of the weather alert to determine a first set of zero or more mobile devices that are located within the boundary of the weather alert;

comparing the weather alert to user profile information corresponding to each mobile device in the first set of mobile devices to determine a second set of zero or more mobile devices whose user profiles indicate that the weather alert should be received by the mobile device; and generating a device specific weather alert for each mobile device in the second set of mobile devices;

for each device specific weather alert, sending the device specific weather alert to the mobile device to which the device specific weather alert corresponds.

2. The method of claim 1, wherein the location data comprises user movement information.

3. The method of claim 1, wherein the meteorological information comprises weather movement information.

4. The method of claim 1, wherein the geographic boundary of the weather alert comprises a geographic boundary based on a projected location of a weather condition to which the weather alert corresponds.

5. The method of claim 1, wherein the determining step further comprises the weather information service determining that an alert should be sent based on a combination of received meteorological data, each of which individually would not otherwise result in the alert.

6. The method of claim 5, wherein the alert comprises a heat index alert, and the combination of received meteorological data comprises temperature data and humidity data.

7. The method of claim 1, wherein determining a geographic boundary comprises adding a predefined buffer distance to a boundary of a received GIS warning.

8. The method of claim 7, wherein the predefined buffer distance is a default buffer distance.

9. The method of claim 7, wherein the predefined buffer distance is based on user profile information corresponding to each mobile device.

10. The method of claim 1, wherein the generating step further comprises overlaying radar data on a base map centered on the location of the mobile device to which the device specific weather alert corresponds.

11. The method of claim 1, wherein the generating step further comprises overlaying lightning data on a base map centered on the location of the mobile device to which the device specific weather alert corresponds.

12. The method of claim 1, wherein the generating step further comprises overlaying GIS warning data on a base map centered on the location of the mobile device to which the device specific weather alert corresponds.

13. The method of claim 1, wherein the generating step further comprises generating a text warning based on the location of the mobile device to which the device specific weather alert corresponds.

14. A system for sending location-based alert information to a plurality of mobile devices having wireless communication capabilities, comprising:

a wireless service provider that provides a wireless communications network through which a plurality of mobile devices communicate, wherein the wireless service provider can determine a substantially unique location of each of the plurality of mobile devices based on their connectivity to the wireless communications network; and a weather information service that receives and analyzes meteorological information from one or more meteorological information sources, wherein the weather information service comprises one or more data processing devices storing computer executable instructions that, when executed:

receives location data for each of the plurality of mobile devices from the wireless service provider;

determines whether a weather alert should be issued based on the received meteorological information and, if so, determining a geographic boundary of the weather alert;

compares the location data for each of the plurality of mobile devices to the geographic boundary of the weather alert to determine a first set of zero or more mobile devices that are located within the boundary of the weather alert;

comparing the weather alert to user profile information corresponding to each mobile device in the first set of mobile devices to determine a second set of zero or more mobile devices whose user profiles indicate that the weather alert should be received by the mobile device; and generating a device specific weather alert for each mobile device in the second set of mobile devices;

for each device specific weather alert, sending the device specific weather alert to the mobile device to which the device specific weather alert corresponds.

15. The system of claim 14, wherein the generating step further comprises overlaying radar data on a base map centered on the location of the mobile device to which the device specific weather alert corresponds.

16. The system of claim 14, wherein the generating step further comprises generating a weather alert based on a projected location of the mobile device to which the device specific weather alert corresponds.

17. The system of claim 14, wherein the geographic boundary of the weather alert comprises a geographic boundary based on a projected location of a weather condition to which the weather alert corresponds.

18. The system of claim 14, wherein the determining step further comprises the weather information service determining that an alert should be sent based on a combination of received meteorological data, each of which individually would not otherwise result in the alert.

19. The system of claim 18, wherein the alert comprises a heat index alert, and the combination of received meteorological data comprises temperature data and humidity data.

20. The system of claim 14, wherein determining a geographic boundary comprises adding a predefined buffer distance to a boundary of a received GIS warning.

21. The system of claim 20, wherein the predefined buffer distance is a default buffer distance.

22. The system of claim 20, wherein the predefined buffer distance is based on user profile information corresponding to each mobile device.

23. The system of claim 14, wherein the generating step further comprises overlaying lightning data on a base map centered on the location of the mobile device to which the device specific weather alert corresponds.

24. The system of claim 14, wherein the generating step further comprises overlaying GIS warning data on a base map centered on the location of the mobile device to which the device specific weather alert corresponds.

25. The system of claim 14, wherein the generating step further comprises generating a text warning based on the location of the mobile device to which the device specific weather alert corresponds.

26. The system of claim 14, wherein the weather information service comprises a third party external to the wireless service provider.

27. The system of claim 14, wherein the weather information service is internal to the wireless service provider.

28. The system of claim 14, further comprising a shared location database for storing the location data of each of the mobile devices, wherein the shared location database is accessible by each of the wireless service provider and the weather information service.

29. A method for alerting a plurality of mobile devices of a hazardous condition, comprising the steps of:
    receiving hazard information from one or more information sources;
    determining a geographic area for which to generate an alert based on the received hazard information;
    comparing a location of each of the plurality of mobile devices to determine a first set of zero or more mobile devices located within the determined geographic area;
    analyzing a user profile of each of the mobile devices in the first set of mobile devices to determine a second set of zero or more mobile devices to receive the alert; and
    generating a device-specific alert for each mobile device of the second set of mobile devices; and
    transmitting each device-specific alert to its corresponding mobile device.

30. The method of claim 29, wherein the receiving step comprises receiving meteorological information.

31. The method of claim 29, wherein the receiving step comprises receiving biological hazard information.

32. The method of claim 29, wherein the receiving step comprises receiving chemical hazard information.

33. The method of claim 30, wherein the generating step further comprises overlaying radar data on a base map centered on the location of the mobile device to which the device specific weather alert corresponds.

34. The method of claim 30, wherein the generating step further comprises overlaying lightning data on a base map centered on the location of the mobile device to which the device specific weather alert corresponds.

35. The method of claim 30, wherein the generating step further comprises overlaying GIS warning data on a base map centered on the location of the mobile device to which the device specific weather alert corresponds.

36. The method of claim 29, wherein the generating step further comprises generating a text warning based on the location of the mobile device to which the device specific weather alert corresponds.

37. The method of claim 30, wherein each devices-specific alert comprises a visual representation of the position of an inclement weather condition in relation to the mobile device to which the device specific alert corresponds.

* * * * *